United States Patent
Wolfinger

[11] 3,885,420
[45] May 27, 1975

[54] METHOD AND APPARATUS FOR MEASURING SMALL VARIATIONS IN THE SPEED OF ROTATING SHAFTS

[75] Inventor: John F. Wolfinger, Schenectady, N.Y.

[73] Assignee: General Electric Company, Schenectady, N.Y.

[22] Filed: Mar. 6, 1974

[21] Appl. No.: 448,605

[52] U.S. Cl. .................................. 73/70.1; 324/161
[51] Int. Cl. ............................................ G01h 1/10
[58] Field of Search .............. 73/70.1, 70, 71.4, 71, 73/71.2, 67, 67.2, 136 A; 324/161, 83 R

[56] References Cited
UNITED STATES PATENTS

| | | | |
|---|---|---|---|
| 2,399,635 | 5/1946 | Hope .................................. | 73/70.1 |
| 2,634,604 | 4/1953 | Hope .............................. | 73/70.1 X |
| 3,434,340 | 3/1969 | Strasberg et al. .................... | 73/71.4 |
| 3,686,956 | 8/1972 | Simpkin .......................... | 73/71.4 X |
| 3,757,167 | 9/1973 | Yoshikawa et al. ................. | 324/161 |

Primary Examiner—Richard C. Queisser
Assistant Examiner—Stephen A. Kreitman
Attorney, Agent, or Firm—John F. Ahern; James W. Mitchell

[57] ABSTRACT

Method and apparatus for measuring torsional vibrations in a rotating shaft. A detection device is connected to provide output pulses at a rate proportional to the instantaneous angular velocity of the shaft. The pulses are compared in a phase detector with pulses produced by a voltage controlled oscillator which oscillator is adjusted to produce pulses at a frequency corresponding to the average angular velocity of the shaft. The phase detector generates an output signal proportional to the instantaneous phase difference between the two pulse inputs which output signal varies as a function of variations in the frequency of pulses from the detection device. The output signal is therefore representative of torsional vibrations in the shaft. The output signal may be filtered to produce a signal having an instantaneous amplitude and frequency corresponding to the torsional vibrations.

9 Claims, 2 Drawing Figures

METHOD AND APPARATUS FOR MEASURING SMALL VARIATIONS IN THE SPEED OF ROTATING SHAFTS

BACKGROUND OF THE INVENTION

The present invention relates to vibration measurement and, more particularly, to a method and apparatus for measuring torsional vibrations in a rotating shaft.

In large machines having a rotating shaft which may weigh several tons, very small torsional vibrations in the shaft will cause stresses which may damage the shaft and in some instances result in shaft breakage and destruction of the machine. Such vibrations may be as small as 0.1°. To detect vibrations various types of devices have been proposed to monitor rotation of the shaft. However, the prior art devices have proven unsatisfactory in detecting torsional vibrations of such small magnitude in time to allow corrective measures to be taken to prevent damage to the shaft, particularly since the torsional vibrations occur at relatively low frequencies in a shaft of large mass. For example, in a power plant using a turbine-generator arrangement, the turbine-generator shaft will have mechanical torsional natural frequencies of oscillation in the sub-synchronous frequency range, i.e., somewhere below the synchronous power generating frequency of 60 Hz. If the reactance in the electric utility system is such as to set up oscillatory currents in the utility system in teh sub-synchronous range, these currents will interact with the field excitation on the generator to produce pulsating air gap torques at slip frequency. The slip frequency air gap torques will produce rotor oscillations and corresponding torques on the turbine-generator shaft. If the slip frequency torque happens to correspond closely to any of the torsional natural frequencies of the shaft, the resulting rotor motions may result in shaft breakage.

It is an object of the present invention to provide an improved method and apparatus for detecting torsional vibrations in a rotating shaft.

It is a further object of the invention to provide an improved method and apparatus for more promptly detecting torsional vibration of smallmagnitude to permit timely corrective action.

In carrying out the object of this invention, in one form thereof, there is provided a probe and a pulse forming circuit for producing a first pulse train having a frequency proportional to the instantaneous angular velocity of a shaft. A pulse generator produces a second pulse train having a frequency proportional to the average angular velocity of the shaft. A phase comparator compares the phase of each pulse in the first pulse train to the phase of a corresponding pulse in the second pulse train. Any deviation in the angular velocity of the shaft will result in a change in the phase relationship between the corresponding pulses and will produce a changing output signal from the phase detector. By appropriate filtering, the phase detector output signal is adjusted to represent only those frequencies of oscillation in the shaft which are of interest.

BRIEF DESCRIPTION OF THE DRAWING

For a better understanding of the invention, reference may be had to the drawing, in which FIG. 1. shows the vibration detection circuit

DESCRIPTION OF THE PREFERRED EMBODIMENT

Figure 1:
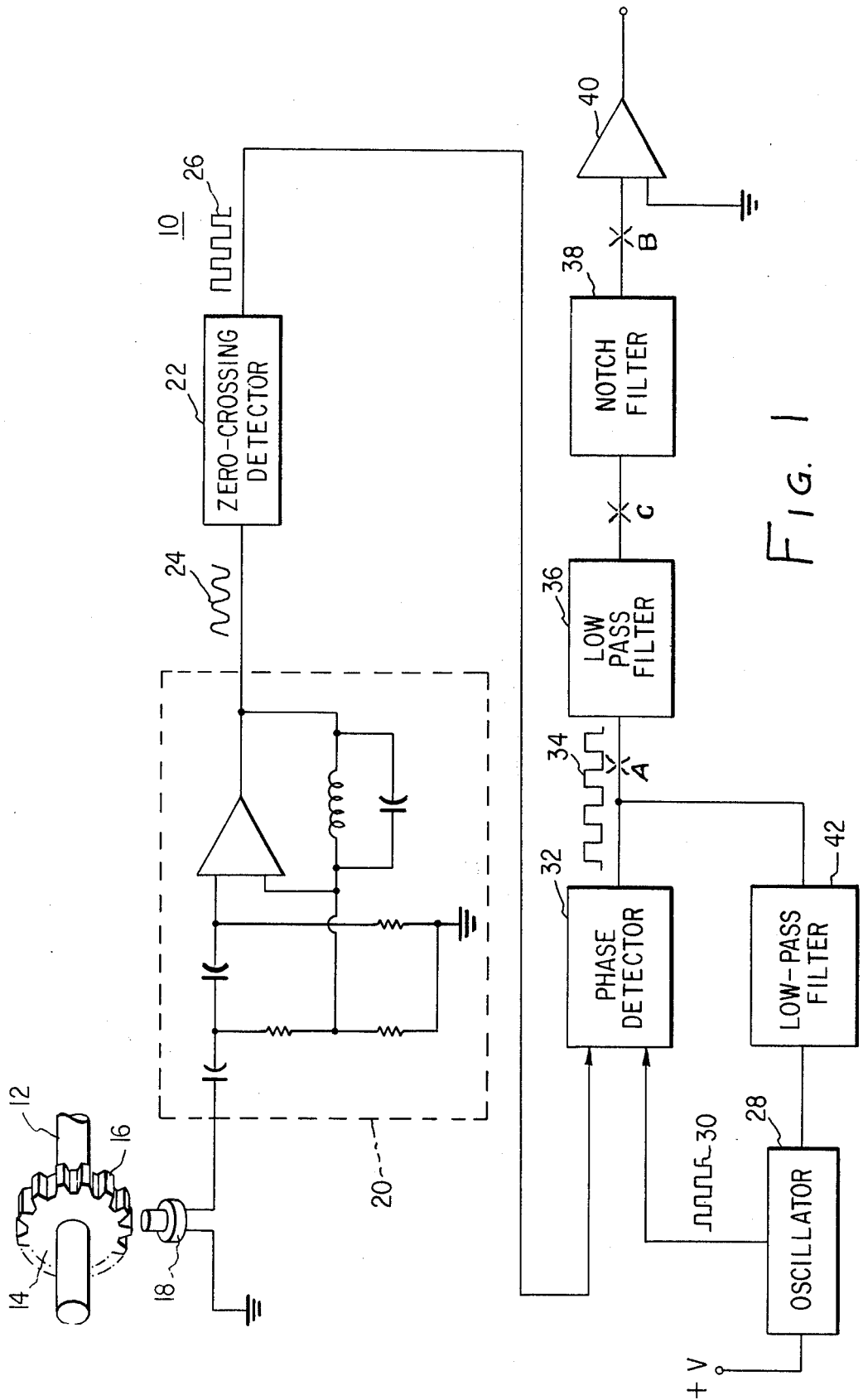
Figure 2:
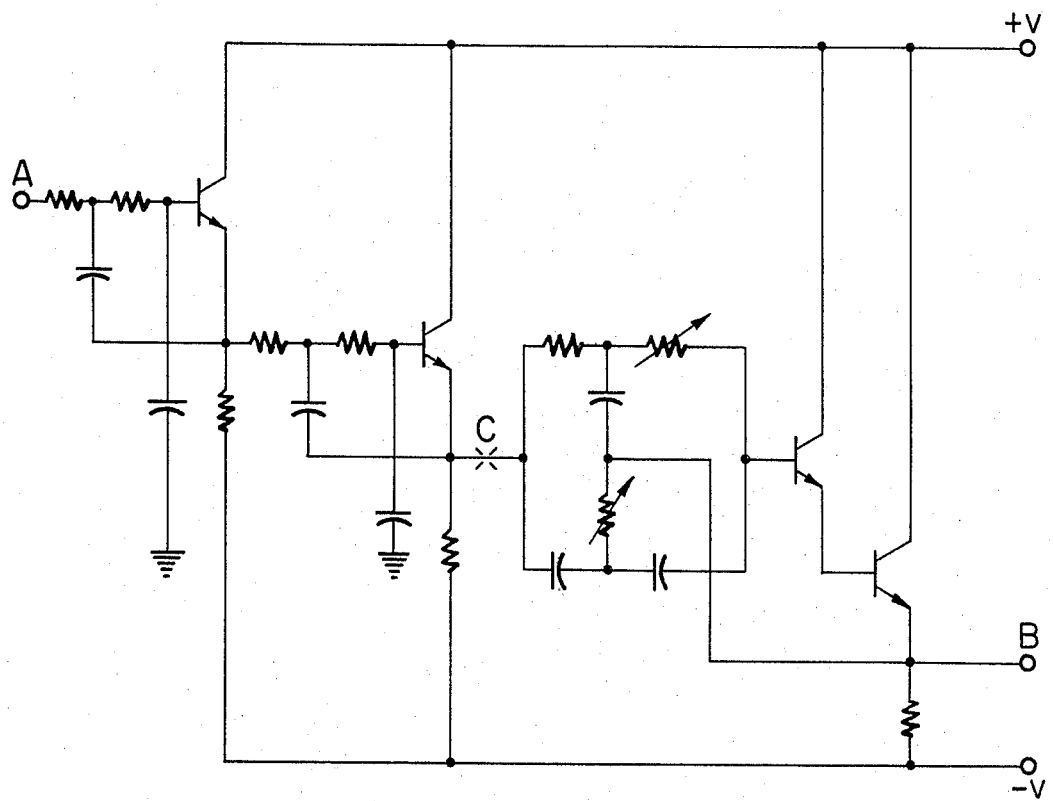
FIG. 2 is a detailed schematic of a portion thereof.

Referring now to the drawing, there is shown a vibration detection circuit 10 according to the present invention for detecting torsional vibrations in a shaft 12. An annular member having a plurality of circumferentially spaced elements, represented by a gear 14 having a plurality of teeth 16, is attached to shaft 12 for rotation therewith. A probe 18 is mounted in juxtaposition to gear 14. Probe 18 may be a magnetic probe of a type well-known in the art for providing an output signal in response to movement of teeth 16 past the tip of probe 18. The output signal from probe 18 is supplied to an input terminal of filter 20 in detection circuit 10. Filter 20 is a combination amplifier, band pass, and high pass filter of a type well-known in the art and serves to remove noise from the output signal from probe 18 to provide a relatively clean signal to zero-crossing detector 22.

Zero-crossing detector 22 converts the sinusoidal signal produced by probe 18 into a series of rectangular pulses. Detector 22 is also of a type well-known in the art which is triggered each time the input signal crosses the zero voltage axis thus changing the sinusoidal signal shown at 24 into the pulse signal shown at 26. The crossover level of signal 24 may be set at any desired point by methods well-known in the art.

A voltage-controlled oscillator 28 is adjusted by means of a control voltage V to provide an output signal 30 comprising a series of rectangular pulses having a frequency corresponding to the frequency of the pulses from detector 22 when the shaft 12 is rotating at constant angular velocity.

The signal 26 is directed into a first input terminal of a phase detector 32 and the signal 30 is directed into a second input terminal of phase detector 32. Detector 32 may be, for example, a flip-flop circuit which is set by the trailing edge of a pulse in signal 30 and reset by the trailing edge of a pulse in signal 26, the signals 30 and 26 being applied respectively to the set and reset terminals of the flip-flop circuit The output of detector 32 will therefore be a pulse width modulated pulse train 34 which, assuming constant angular velocity of shaft 12, will have a constant average value. If torsional vibrations occur in shaft 12, the frequency of the pulses 26 will vary and produce a changing phase relationship between those pulses and the pulses 30. This will result in a change in the width of the pulses from phase detector 32 and a corresponding variation in the average value of the pulse train 34. As is well known the relative amplitudes of the frequency components making up the pulse train 34 will likewise vary as the widths of individual pulses change. In addition, the frequency of the torsional vibrations of shaft 12 will be represented by the frequency at which the average value of pulse train 34 varies, which average value is directly related to the frequency with which the widths of individual pulses within pulse train 34 vary.

Pulse train 34 is directed into a low pass filter 36 which removes the high frequency components and produces an output signal which corresponds to those variations in the average value of pulse train 34 below some predetermined cut-off frequency, for example, 100 Hz. The signal from filter 36 therefore represents the amplitude and frequency of torsional vibrations in shaft 12.

It has been found that the detection system of the present invention is highly sensitive and when used in conjunction with a gear 14 produces an output signal having a component at the frequency of rotation of gear 14. This is caused by the fact that the gear teeth are always slightly eccentric and therefore introduce this component of frequency into the signal. Since this signal is not related to torsional vibrations in the shaft 12, a narrow band-reject or notch filter 38 is connected to receive the signal from filter 36 and removes therefrom the component signal at rotational frequency. The output signal from filter 38 is buffered in amplifier 40 and is then supplied to any suitable signal responsive or signal measuring device.

For the case in which the average rotational velocity of shaft 12 is not a constant, the frequency of the pulses 30 are adjusted by summing the average value of the pulse train 34 with the frequency control voltage V to adjust the oscillation frequency of voltage controlled oscillator 28. To prevent response of oscillator 28 to variations caused by vibrations in shaft 12, the pulse train 34 is passed through a low-pass filter 42 before being supplied to oscillator 28. Filter 42 is of a type well-known in the art, and since the response of oscillator 28 to changes in average frequency should be slow to prohibit transient response, the filter 42 is preferably designed with an upper cut-off frequency in the order of 5Hz.

Although the invention has been described with reference to a particular embodiment, it is to be appreciated that certain changes may be made without departing from the spirit and scope of the invention. For example, in order to measure torsional vibrations of the shaft of a three phase generator, the voltage output signals from the generator can be full-wave rectified and passed through a band-pass filter to select one of the harmonics of the rectified waveform to be used as an input signal to the zero-crossing detector 22. This method will eliminate the need for the probe 18 and gear 14 but may necessitate high voltage connections to the generator output. Consequently, the particular method selected for obtaining the signal 24 may well depend on the particular environment in which the equipment is to be used.

Accordingly, it is intended that all matter contained in the above description and shown in the accompanying drawing shall be interpreted as illustrative and not in a limiting sense.

What is claimed as new and desired to be secured by Letters Patent of the United States is:

1. Apparatus for detecting instantaneous torsional vibrations in a rotating shaft, said apparatus comprising:
    first means for generating a first signal at a frequency proportional to the instantaneous angular velocity of said shaft;
    second means for generating a second signal at a frequency proportional to the average angular velocity of said shaft; and
    third means connected to receive said first and second signals and responsive thereto to produce a third signal having an average value proportional to the phase difference between said first and second signals.

2. The apparatus as defined in claim 1 and including:
    fourth means connected to receive said third signal and responsive thereto to produce a fourth signal having an amplitude and frequency corresponding to said instantaneous torsional vibrations of said shaft.

3. The apparatus as defined in claim 1 wherein said first means comprises:
    an annular member mounted for rotation with said shaft, said member having a plurality of circumferentially spaced elements;
    a probe mounted adjacent said member, said probe being responsive to rotation of said member to provide a pulse signal as each of said plurality of elements passes by said probe, and
    a zero-crossing detector connected to receive said pulse signal and responsive thereto to produce said first signal.

4. The apparatus as defined in claim 1 wherein said third means comprises:
    a flip-flop circuit connected to be reset by said first signal and to be set by said second signal, said flip-flop circuit producing said third output signal comprising a plurality of pulses, each of said pulses having a pulse width proportional to the phase difference between said first and second signals.

5. The apparatus as defined in claim 1 wherein said second means comprises a voltage controlled oscillator.

6. The apparatus as defined in claim 5 and including a feedback loop for passing predetermined frequency components of said third signal to said oscillator, said oscillator being responsive to said predetermined frequency components to adjust the frequency of said second signal.

7. The apparatus as defined in claim 6 wherein said feedback loop includes a serially connected low-pass filter.

8. A method for measuring torsional vibrations in a rotating shaft comprising the steps of:
    generating a first signal at a frequency proportional to the instantaneous angular velocity of said shaft;
    generating a second signal at a frequency proportional to the average angular velocity of said shaft; and
    comparing the phase relationship between said first and second signals to produce a third signal having an average value proportional to the phase difference between said first and second signals.

9. The method as defined in claim 8 and including the step of
    filtering said third signal to produce a fourth signal having an amplitude and frequency corresponding to the amplitude and frequency of torsional vibrations in said shaft.

* * * * *